(12) United States Patent
Keefover et al.

(10) Patent No.: US 9,140,218 B2
(45) Date of Patent: Sep. 22, 2015

(54) ACTUATOR WITH VALVE RETURN

(71) Applicant: BorgWarner Inc., Auburn Hills, MI (US)

(72) Inventors: Robert Keefover, Lake Orion, MI (US); Aaron Feiner, Oxford, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/557,964

(22) Filed: Dec. 2, 2014

(65) Prior Publication Data

US 2015/0159595 A1 Jun. 11, 2015

Related U.S. Application Data

(63) Continuation of application No. 14/541,729, filed on Nov. 14, 2014.

(60) Provisional application No. 61/914,639, filed on Dec. 11, 2013.

(51) Int. Cl.
*F02M 25/07* (2006.01)

(52) U.S. Cl.
CPC .................. *F02M 25/0773* (2013.01)

(58) Field of Classification Search
CPC .......... F02M 25/0771; F02M 25/0772; F02M 25/0773; F02M 25/0789; F02M 25/0793
USPC ............... 123/90.11, 568.21, 568.23, 568.24, 123/568.26, 337; 251/129.01, 129.11
See application file for complete search history.

(56) References Cited

U.S. PATENT DOCUMENTS

| 6,571,782 B2* | 6/2003 | Brosseau et al. .......... 123/568.18 |
| 7,086,636 B2* | 8/2006 | Telep et al. .................... 251/77 |
| 7,607,638 B2* | 10/2009 | Wilson et al. ............. 251/129.11 |
| 8,316,830 B2* | 11/2012 | Keefover et al. .......... 123/568.21 |
| 8,561,645 B2* | 10/2013 | Leroux et al. .............. 137/637.1 |
| 8,651,455 B2* | 2/2014 | Albert et al. .................. 251/248 |
| 2014/0069397 A1* | 3/2014 | Simons .................... 123/568.24 |

* cited by examiner

*Primary Examiner* — Hai Huynh
(74) *Attorney, Agent, or Firm* — BrooksGroup

(57) ABSTRACT

A number of variations may include a product, which may include an actuator including a rotatory portion for moving a valve from a first position to a second position and a biasing spring for retuning the valve to the first position.

9 Claims, 14 Drawing Sheets

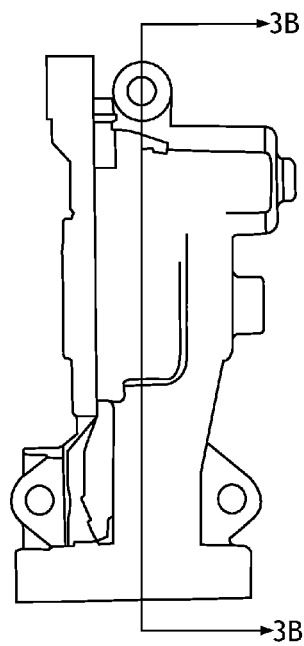
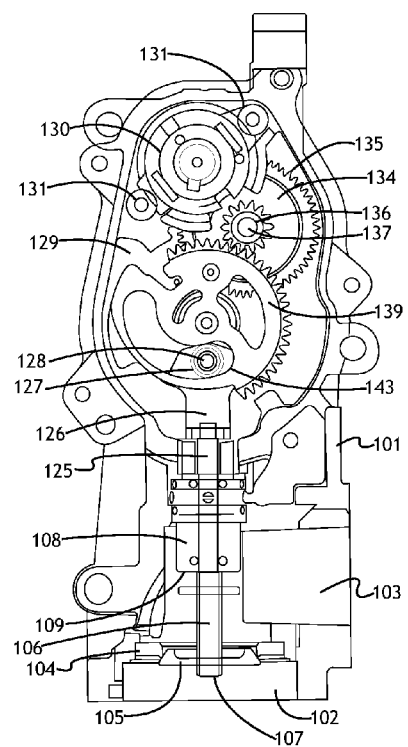
Fig.3A
Fig.3B

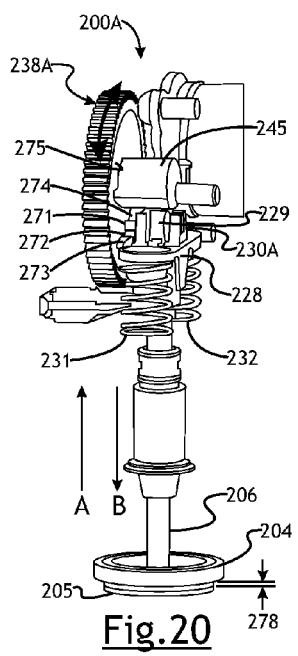 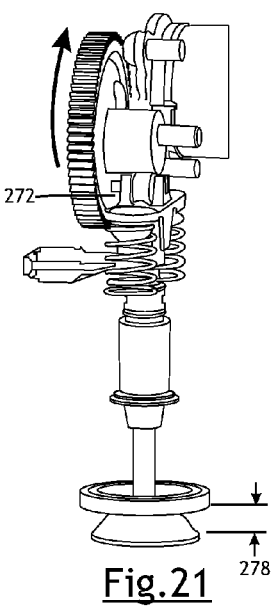 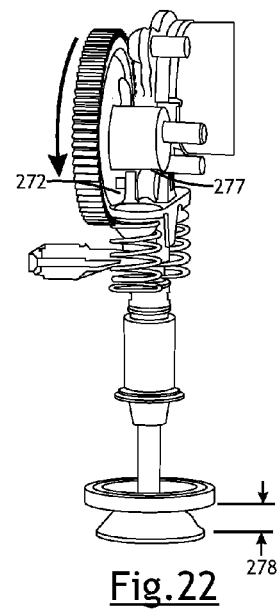

ACTUATOR WITH VALVE RETURN

CROSS-REFERENCE TO RELATED APPLICATIONS

This application is a continuation of application Ser. No. 14/541,729 filed Nov. 14, 2014 and claims the benefit of U.S. Provisional Application No. 61/914,639 filed Dec. 11, 2013.

TECHNICAL FIELD

The field to which the disclosure generally relates to includes actuators.

BACKGROUND

Actuator assemblies may be used in vehicles.

SUMMARY OF ILLUSTRATIVE VARIATIONS

A number of variations may include a product, which may include an actuator including a rotary portion for moving a valve from a first position to a second position and a biasing spring for retuning the valve to the first position.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

FIG. 3A is a side view of the actuator and poppet valve assembly shown in FIG. 2.

FIG. 3B is a sectional view take along lines D-D of FIG. 3A.

FIG. 20 shows D.C. motor actuated poppet valve assembly 200A in an unpowered state.

FIG. 21 shows D.C. motor actuator poppet valve assembly with the poppet valve in the full open position according to a number of variations.

FIG. 22 shows a D.C. motor actuated poppet valve assembly in one of several progressive stages of closing the valve.

Select examples of variations within the scope of the invention will become more fully understood from the detailed description and the accompanying drawings, wherein:

DETAILED DESCRIPTION OF ILLUSTRATIVE VARIATIONS

The following description of the variations is merely illustrative in nature and is in no way intended to limit the scope of the invention, its application, or uses.

Control of vehicle exhaust emissions and meeting fuel economy standards are mandatory requirements in most countries. Oxides of Nitrogen (NOx) and particulate matter are two components of the engine exhaust emissions that must be controlled.

Figure 1:
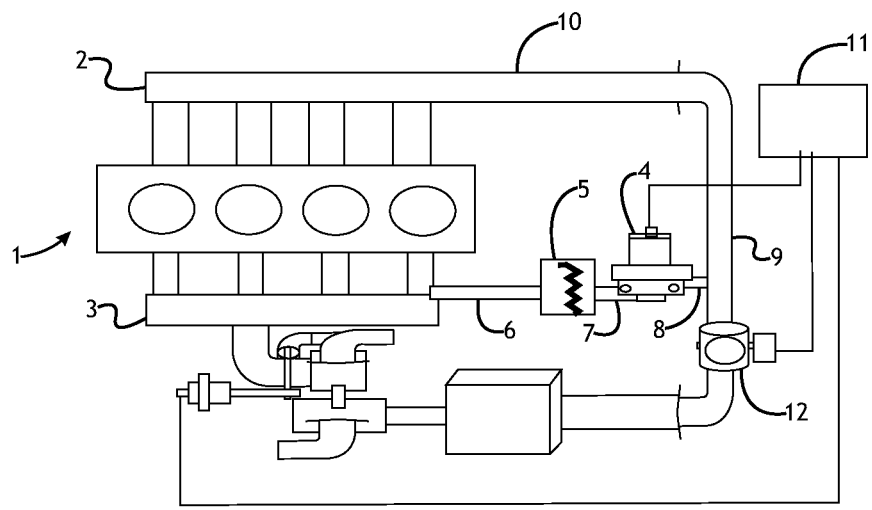
FIG. 1 illustrates an engine breathing system, which may be used in a number of variations.

Formation of NOx will occur at higher engine combustion temperatures and particulates will form at lower combustion temperatures. A system, referred to as the exhaust gas recirculation (EGR) system, has been developed to control combustion temperatures and control NOx and particulate emissions. A schematic of a typical system is shown in FIG. 1. A portion of the exhaust gas is recirculated back to the intake manifold where it will be combined with incoming air and fuel. The exhaust gas portion of the mixture does not support combustion and when this mixture is compressed and ignited, in the cylinder, the inert exhaust gas will control the combustion temperature and limit the formation of NOx and particulate in the exhaust.

Referring to FIG. 1, the engine 1 has an intake manifold 2 and an exhaust Manifold 3. The EGR system consists of an exhaust gas recirculation (EGR) valve 4 that controls the flow of exhaust gas to intake manifold 2. An EGR cooler 5 is used to reduce the temperature of the exhaust gas. Conduits 6, 7, 8, 9 and 10 provide the interconnection between the exhaust manifold 3, EGR cooler 5, EGR Valve 4, and Intake manifold 2. The system shown uses an electrically controlled EGR valve. An electronic control unit (ECU) 11 will provide a signal that will control the opening/closing of the valve. As the EGR valve opens and closes it will increase or decrease the flow rate of exhaust gas to the intake manifold. It is also typical to have a throttle valve 12 to control airflow into the intake manifold.

The required EGR flow rate is dependent upon several factors that include the displacement of the engine and the pressure differential between the exhaust and the intake system.

Referring to FIG. 1, the system will operate in the following manner. The ECU 11 will be programmed with a map of engine operating conditions and a desired EGR flow for each condition. EGR valve 4 has a position sensor that is connected to the ECU 11 and it will provide an output signal that is relative to the valve position and flow through the valve. The desired flow is translated to a position sensor output signal and an actuator control signal. The control signal is applied to the actuator, of the EGR valve 4, causing the valve to move away from the valve seat and allow exhaust gas to flow from the exhaust manifold 3 to intake manifold 2. The position sensor and its output signal are part of a closed loop control system for the EGR valve. The position sensor will provide feedback to the ECU that will indicate if it has achieved the desired position and related flow. The ECU will adjust the actuator control signal to achieve-or-maintain the desired valve position. The recirculated exhaust gas will mix with the incoming air and be distributed to the engine cylinders by the intake manifold. The mixture of exhaust gas, air, and fuel will determine combustion temperature and control of the level of NOX and particulate matter.

Fuel economy may also be improved by the use an EGR system. When the EGR opens, the vacuum or pressure in the intake manifold and exhaust may be reduced. The reduction of vacuum or pressure will reduce the pumping losses of the engine the amount of fuel used by the engine.

A number of electric actuators such as linear solenoids, D.C. motors, torque motors, and stepper motors may be used to actuate the EGR valve. Valve position sensing can also be achieved by alternate methods such as counting steps of a stepper motor or by regulating vacuum to a pneumatically controlled EGR valve.

A number of valve types such as throttle, poppet, or flap may be used to control the flow exhaust gas.

The type of actuator and valve may be determined, in part, by the type of engine and EGR system used for emission controls or fuel economy. For example, the exhaust from a diesel engine may contain high amounts of residue that can form a sticky lacquer like substance that may provide resistance to opening the valve. A higher force actuator, in excess of 300N, may be required to open the valve. D.C. motor actuators with multi-stage drives have been used for these EGR valve applications.

In another example, the exhaust from a gasoline engine may contain a lesser degree of residue due, in part, to the higher exhaust temperatures and chemical reaction during combustion. The operating force of the actuator may be substantially less for these engines. Linear solenoid actuators have been used for these EGR valve applications and their typical operating forces range from 20N to 2N between the open and closed valve conditions.

More recent engine developments, such as GDI engines (gasoline direct injection), have made use of "cooled EGR". The faster cooling of exhaust gas may increase the level of exhaust residue that can resist the EGR valve movement and increase the requirement for actuator force. Although the level of residue is higher for these gasoline engines it may not be as severe as the residue from the diesel engine and the actuator force requirement may be less.

Several types of valves could be used for EGR applications. For example: a poppet style, flap style, or throttle style valve could be capable of providing these functions. These valves may be actuated by several different types of actuators, for example: vacuum/pressure motors, D.C. motor, torque motor, stepper motor, or linear solenoid type actuators could be capable of actuating the valve.

Figure 2:
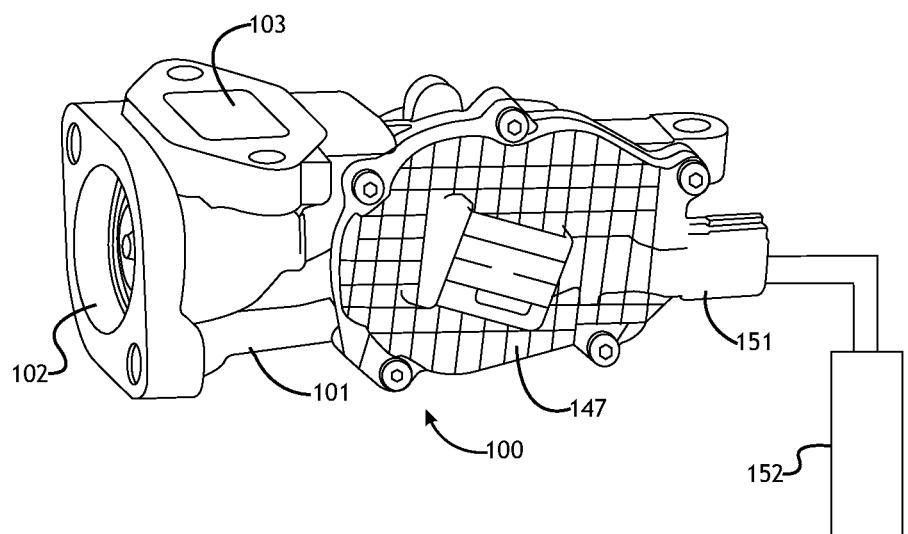
FIG. 2 illustrates an actuator and poppet valve assembly according to a number of variations.

FIG. 2 shows a typical D.C. motor actuated poppet valve assembly 100. The valve assembly has a unitary actuator and valve housing 101. The housing 101 may be made of aluminum, cast iron, or other suitable material. The housing 101 has an inlet 102 for receiving a fluid and an outlet 103 for delivering the fluid. Referring to FIG. 3A and section view FIG. 3B, a valve seat 104 is disposed within valve housing 101 and secured by staking, casting it in position, or other suitable means. A moveable poppet valve 105 is coaxial with the valve seat 104 for controlling the fluid flow through the valve assembly.

The poppet 105 may be fully closed and seated on the valve seat 104 and essentially block flow between the inlet 102 and outlet 103. Poppet valve 105 may move axially away from valve seat 104 to a fully open position where maximum flow will occur between the inlet 102 and outlet 103. Poppet valve 105 may also move axially away from the valve seat 104 to a number of intermediate positions between the fully closed and fully open positions to control the rate of fluid flow at values that are less than the maximum fluid flow rate.

A valve stem 106 is located within the housing and is coaxial with poppet valve 105 and valve seat 104. The valve stem 106 has a first end 107 that is connect to a central location of poppet valve 105. Poppet valve 105 may be attached to the valve stem 106 by welding, riveting, staking or other suitable means. Valve stem 106 is guided and supported by a bushing assembly 108 that is coaxial with the valve stem 106 and disposed within housing 101. Referring to partial section view FIG. 4, bushing assembly 108 has a first end 109 with counter bore section 110 consisting of multiple stepped sections 110A, 110B, and 110C having different diameters. A first stem seal 111, stem scraper 112, and retainer washer 113 are coaxial with the valve stem 106 and disposed within the multiple stepped sections 110A, 110B, and 110C of counter bore section 110. Stem scraper 112 may be disposed in a stepped section 110B of counter bore section 110. Stem scraper 112 has an outer diameter that is smaller than the inside diameter of stepped section 110B and may move within stepped section 110B. Stem scraper 112 will have an inside diameter that is greater than valve stem 106 but will be capable of removing unwanted debris from valve stem 106.

Retainer washer 113 may be installed stepped section 110C of counter bore section 110 and is secured to the bushing assembly by staking or other suitable means. Retainer washer 113 will secure the stem seal 111 and stem scraper 112 in the bushing assembly 108.

Bushing assembly 108 has a second end 114 with counter section 115 consisting of multiple stepped sections 115A and 115B. A second stem seal 116 and retainer washer 117 are coaxial with the valve stem 106 and disposed within multiple stepped sections 115A and 115B of counter bore section 115. The retainer washer 117 may installed in stepped section 115A of counter bore section 115 and may be secured to the bushing assembly by staking or other suitable means. Retainer washer 117 will secure the stem seal 116 in the bushing assembly 108.

The first stem seal 111 and second stem seal 116 define a radial space 118 between the outer diameter of valve stem 106 and the inner diameter of bushing assembly 108. Radial space 118 extends axially along a length of the bushing assembly 108 and valve stem 106 defined by the positions of stem seals 111 and 116. Stem seal 111 will prevent debris from entering space 118 from the first end 109 of bushing assembly 108 and stem seal 116 will prevent debris from entering space 118 from the second end 114 of bushing assembly 108.

Two O-ring seals 119 and 120 are spaced axially along the outside diameter of bushing 108. Bushing 108 has a circumferential contoured groove 121 located in the space between O-rings 119 and 120. When bushing 108 is installed in housing 101, the O-ring seals 119 and 120 will create a seal between the bushing assembly 108 and the housing 101. The circumferential groove 121 will define a space 122 between O-ring seals 119, 120, and housing 101. Contoured groove 121 will have at least one passage 123, shown as a hidden line, which will allow fluid communication between space 122 and space 118. Valve housing 101 has a vent passage 124 that will allow fluid communication between space 122 and atmosphere. Passage 123, space 122, and vent passage 124 will allow space 118 to be essentially at atmospheric conditions. This will limit potential contamination from being forced into actuator portion 129 of valve assembly 100.

Figure 4:
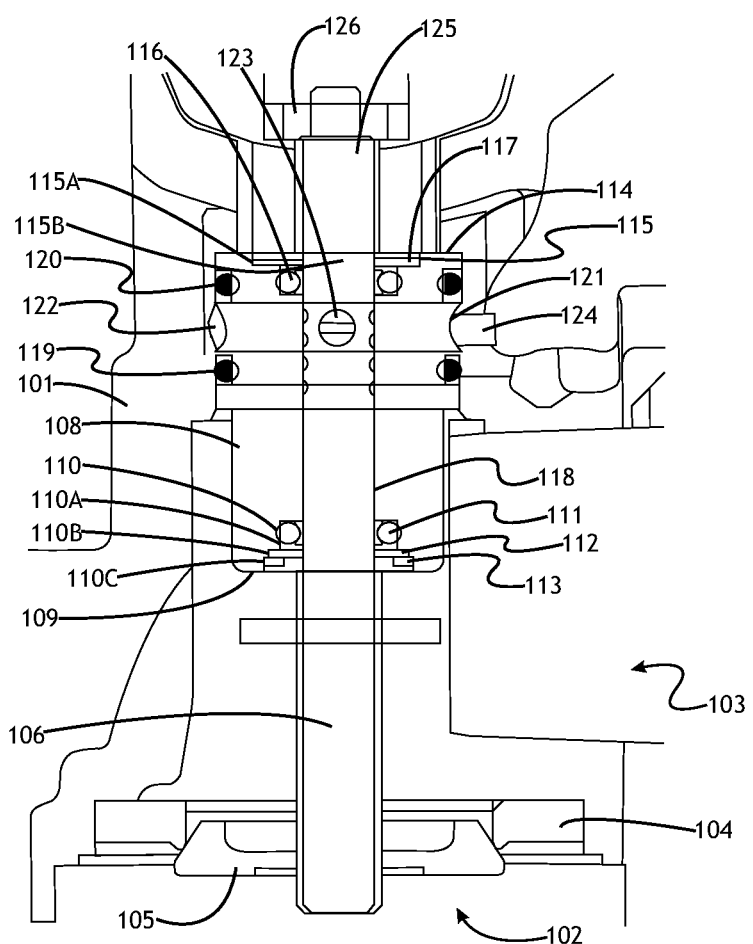
FIG. 4 is a partial, sectional view of an actuator and valve assembly according to a number of variations.

Referring to FIGS. 3B and 4, valve stem 106 has a second end 125 extending axially through the second end 114 of bushing assembly 108. A link 126 is attached to second 125 end of valve stem 106 by riveting, staking or other suitable means. A ball bearing 127 is attached to link 126 by a pin 128 and is secured by riveting, staking or other suitable means.

Figure 5:
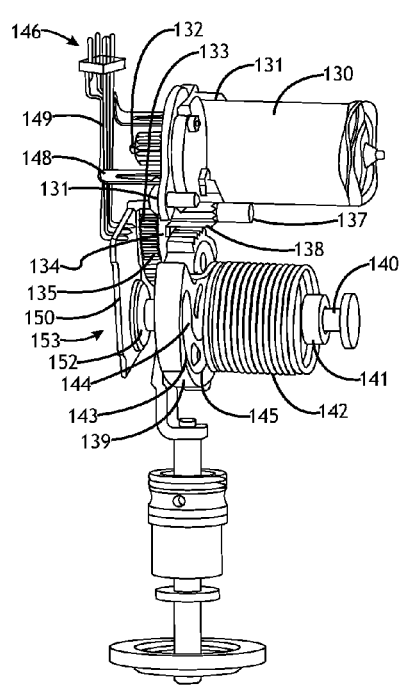
FIG. 5 is a perspective view, with portions removed, of an actuator and valve assembly according to a number of variations.

Referring to FIGS. 3B, 4, and 5, housing 101 has an actuator portion 129 for receiving the actuator components: D.C. motor 130, intermediate gear 134, Pin 137, output gear 139, Shaft 140, bearing 141, and spring 142. D.C. motor 130 is installed into actuator portion 129 and is retained by threaded fasteners 131. D.C. motor 130 has a shaft 132 that is rotatable when an electrical control signal is applied to the D.C. motor. A pinion gear 133 is attached to shaft 132 and will rotate with shaft 132. Intermediate gear 134 has a first gear section 135 that engages and rotates with pinion gear 133. Intermediate gear 134 also has a central through-hole 136 that is sized to slide over pin 137. Pin 137 is press fit into housing 101 and will allow rotation of Intermediate gear 134 about its axis. Intermediate gear 134 has a second gear section 138 that is integrally formed as part of the intermediated gear 134.

Output gear 139 is attached to a shaft 140 by press fit or other suitable means. The shaft 140 is supported by at least one bearing 141 that is installed into housing 101 and retained by press fit or other suitable means. Bearing 141 will allow rotation of the output gear 139 about the axis of shaft 140. Output gear 139 engages the second gear section 138 of intermediated gear 134. When an electrical control signal is applied to D.C. motor 130, motor shaft 132 will rotate. Pinion gear 133, first and second gear sections 135, 138 of the intermediate gear 134, and output gear 139 will rotated in response to the application of the electrical control signal and the rotation of the motor shaft 132.

Output gear 139 has a cam 143 integrally formed in the gear. Ball bearing 127, attached to link 126, is engaged with cam 143. There is sufficient clearance between the cam 143 and outside diameter of the bearing 127 to allow relative movement. Contacting surfaces 144 and 145 of cam 143 are eccentric with the axis of the output gear 139 therefore rotation of the output gear will cause bearing 127 to move radially with respect to the center of the output shaft 140. Since bearing 127, link 126, valve stem 106, and poppet valve 105 are interconnected; rotation of the output gear 139 in a first direction will cause the poppet valve to move away from the valve seat and rotation of the output gear 139 in a second direction will cause the poppet valve to towards the valve seat. This movement of the poppet valve 105 relative to the valve seat 104 will allow control of fluid flow through the valve between the inlet 102 and outlet 103.

The size of: pinion gear 133, first and second gear sections 135, 138 of the intermediate gear 134, and output gear 139 will provide a mechanical advantage that will increase the torque provided by D.C. motor 130. The size of the gears and shape of cam 143 will determine the overall mechanical advantage and force available to open and close the valve.

A torsion spring 142 is coaxial with output gear 139 and shaft 140. A first end of torsion spring 142 is engaged with output gear 139 and a second end is engage with housing 101. The bias of torsion spring 142 is applied in manner that will cause output gear 139 to rotate in a direction that will cause poppet valve 105 to seat against valve seat 104 essentially blocking fluid flow between inlet 102 and outlet 103.

Figure 6:
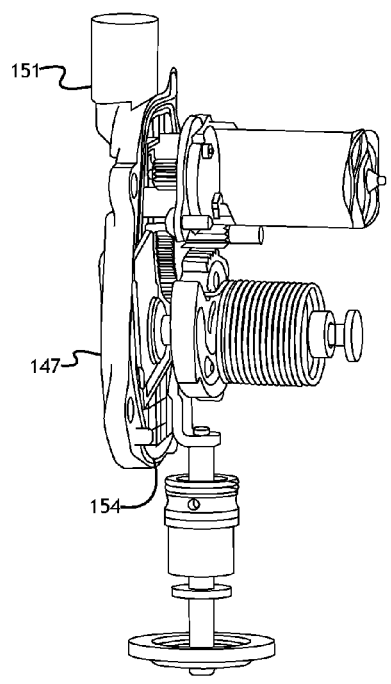
FIG. 6 is a perspective view, with portions removed, of an actuator and valve assembly according to a number of variations.

Referring to FIGS. 2, 5, and 6, valve assembly 100 has a lead frame 146 imbedded in cover 147. The cover 147 may be attached to housing 101 by threaded fasteners, crimp ring, or other suitable means. A seal 154 may be located between the cover and housing to prevent debris from entering the housing. FIG. 5 shows the lead frame 146 with cover material removed and FIG. 6 shows cover material over molded on the lead frame 146. Lead frame 146 may include several individual terminals. For example, terminals 148 and 149 may provide electrical connection to D.C. motor 130 and position sensor 153. A molded electrical connector 151 is formed in cover 147. A mating connector, with terminals, may engage electrical connector 151 and the terminals of lead frame 146 and make the electrical connections to ECU 152.

The valve position and fluid flow is typically controlled by a closed loop control system that is part of and electrical control unit (ECU) 152 shown in FIG. 2. The ECU will provide a control signal to the D.C. motor 130 and receive poppet valve position feedback from position sensor 153. Each valve position will correspond to a specific position sensor output voltage. The ECU will adjust the control signal to the D.C. motor to achieve and maintain a specific valve position that corresponds to the specific valve position voltage.

The position sensor 153 may be a non-contacting type and may use magneto-resistive, inductive, Hall Effect, or other suitable technology. Sensor 153 may have a sensing circuit 150 that will receive feedback from a sensing element 152. Sensing circuit 150 is disposed in cover 147 and connected to the lead frame 146 by soldering, contact pressure, or other suitable means. The sensing element 152 may be attached to the output gear 139, output shaft 140, or other suitable location. Sensing element 152 will provide feedback to the sensing circuit 150 when output gear 139 is rotated in response to an electrical control signal applied to D.C. motor 130. The sensing circuit will provided a valve position voltage that corresponds to a specific gear and valve position.

It should be noted there may be a small error in actual valve position since the sensor element is located on the gear and is measuring the gear position. The clearance between bearing 127 and contacting surfaces 144 and 145 of cam 143 may allow some free movement of bearing 127, valve stem 106, and poppet valve 105 that may result in a small valve position error.

Valve assembly 100 is capable of high fluid flow and high valve operating forces that may be suitable for some applications. The higher capability may result in a higher cost and design complexity. Some applications may not need the higher capability or complexity. It is therefore important to "right size" an actuator and valve assembly that will be a better fit for these application. Following is a description of the invention which includes an optimized actuator and valve assembly. A feature of the invention will be a unique method of actuating the valve in manner that will force the valve in both directions between the valve opening and closing positions.

Figure 7:
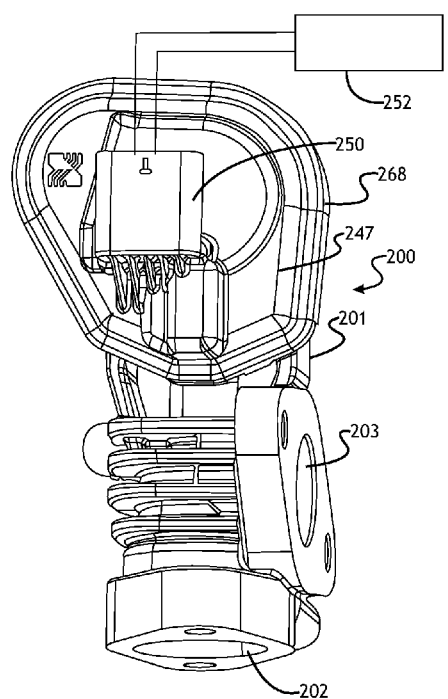
FIG. 7 is a perspective view of an actuator and valve assembly according to a number of variations.
Figure 8A:
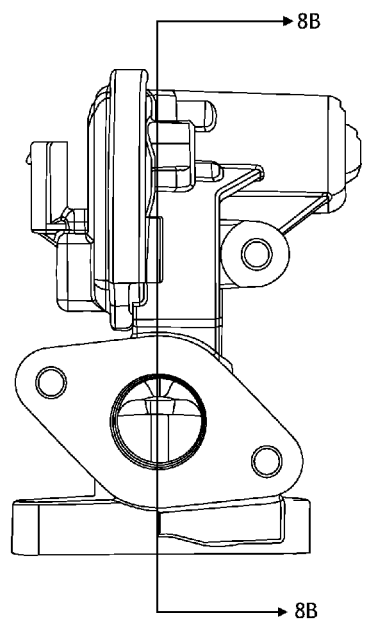
FIG. 8A is a side view, with portions removed, of an actuator and valve assembly according to a number of variations.

FIG. 7 shows D.C. motor actuated poppet valve assembly 200. The valve assembly has unitary actuator and valve housing 201. The housing may be made of aluminum, cast iron or other suitable material. The housing has an inlet 202, for receiving a fluid, and an outlet 203 for delivering the fluid. Referring to FIG. 8A and section view FIG. 8B, a valve seat 204 is disposed within valve housing 201 and secured by staking, casting it in position, or other suitable means. A moveable poppet valve 205 is coaxial with the valve seat for controlling the fluid flow through the valve assembly 200.

The poppet valve 205 may be fully closed and seated on the valve seat 204 and essentially block flow between the inlet 202 and outlet 203. The poppet valve 205 may move axially away from valve seat 204 to a fully open position where maximum flow will occur between the inlet 202 and outlet 203. Poppet valve 205 may also move axially away from the valve seat 204 to a number of intermediate positions between the fully closed and fully open positions to control the rate of fluid flow at values that are less than the maximum fluid flow rate.

A valve stem 206 is located within the housing and is coaxial with poppet valve 205 and valve seat 204. The valve stem 206 has a first end 207 that is connect to a central location of poppet valve 205. Connection can be made by welding, riveting, staking, or other suitable means. Valve stem 206 is guided and supported by a bushing 208 that is coaxial with the valve stem 206 and disposed within housing 201.

Figure 8B:
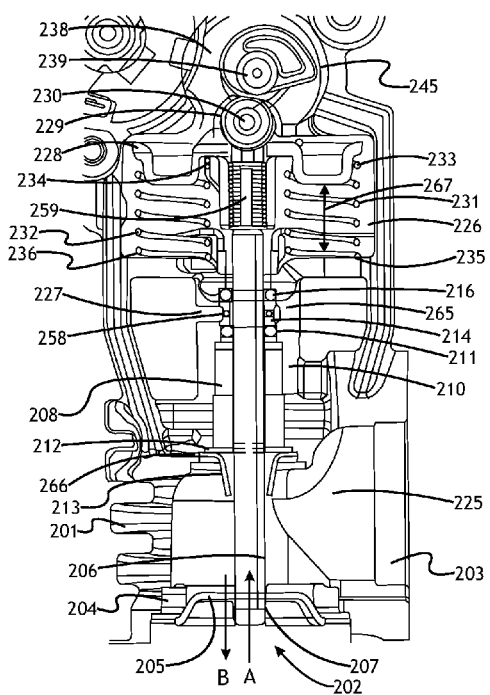
FIG. 8B is a sectional view take along lines B-B of FIG. 8A.
Figure 9A:
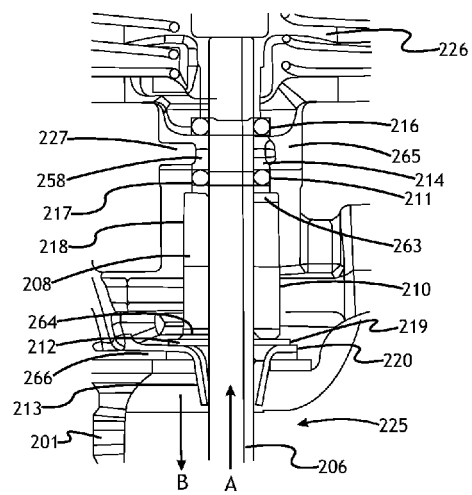
FIG. 9A is a partial, sectional view of an actuator and valve assembly according to a number of variations.

Referring to partial section view FIG. 9, housing 201 has counter bore section 210 consisting of multiple stepped sections having different diameters. A stem shield-retainer 213, stem scraper 212, bushing 208, first stem seal 211, spacer 214, and second stem seal 216 are coaxial with the valve stem 206 and disposed within counter bore section 210. Counter bore section 210 is designed to receive stem shield-retainer 213, stem scraper 212, bushing 208, first stem seal 211, spacer 214, and second stem seal 216 from one direction, for example, direction A shown in FIG. 8B.

Figure 9B:
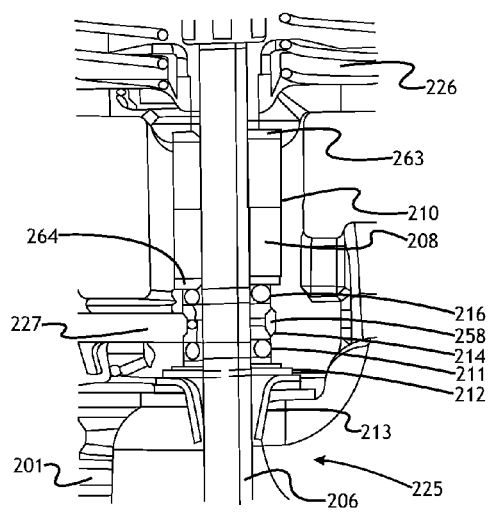
FIG. 9B is a partial, sectional view of an actuator and valve assembly according to a number of variations.
Figure 10:
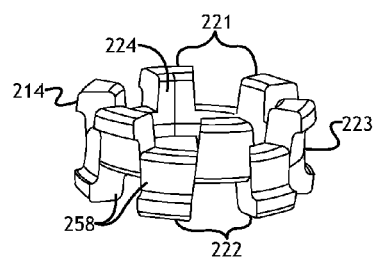
FIG. 10 is an enlarged, perspective view of a spacer according to a number of variations.

Referring to partial section view FIG. 9, sealing system 265 including first stem seal 211, a spacer 214, and second stem seal 216 may be disposed in a first stepped section 217 of counter bore section 210. The stem seals 211 and 216 are spaced apart by spacer 214. Each stem seal will provide an outer radial seal to housing 201 and inner radial seal to the valve stem 206. Referring to FIG. 10, spacer 214 is a generally cylindrical part with castellation features 221 and 222 separated by a circumferential recess 223. Spacer 214 also has an inner surface 224 that has a diameter greater than valve stem 206 to allow unrestricted movement and contact. Castellation features 221, 222, inner surface 224, and circumferential recess 223 create a space 258 within housing 201. Housing 201 has a vent passage 227, located between first stem seal 211 and second stem seal 216, that will allow fluid communication between space 258 and atmosphere. Vent passage 227 will essentially keep space 258 at atmospheric conditions in the event of small levels of leakage past either stem seal. This will limit potential contamination from being forced into either valve portion 225 or actuator portion 226 of valve assembly 200.

Referring to FIG. 8B and FIG. 9, bushing 208 may be disposed in a second stepped section 218 of counter bore section 210. Bushing 208 has a first end 263 and second end 264 and it may be retained in the housing by staking, press fit, or other suitable means. Bushing 208 supports and guides valve stem 206 and will retain sealing system 265 including first stem seal 211, spacer 214, and second stem seal 216 in housing 201. First stem seal 211, spacer 214, and second stem seal 216 are located at first end 263 of bushing 208. This location is further away from fluid flow through valve assembly 200 and this may be desirable when the fluid flow has a high temperature that may exceed the operating temperature of the seals.

It is also possible to locate sealing system 265 in a location closer to the fluid flow if the temperature of the fluid flow is lower and within the operating temperature of the seals. FIG. 9B shows sealing system 265 including first stem seal 211, spacer 214, and second stem seal 216 located at second end 264 of bushing 208. Referring to FIG. 9B, the numbers shown for the components and features are similar to number used for components and features used in FIG. 9. Again, referring to FIG. 9B, the location of vent 227 and space 258 would be moved to a suitable location in the area around the second end 264 of bushing 208. The multiple stepped features of counter bore 210 would be adjusted for the new seal and spacer location at second end 264 of bushing 208. Counter bore section 210 is also designed to receive stem shield-retainer 213, stem scraper 212, bushing 208, first stem seal 211, spacer 214, and second stem seal 216, from one direction, for example, direction A shown in FIG. 9B.

FIG. 8B and FIG. 9 show anti-contamination system 266 including stem scraper 212 and stem shield-retainer 213 located at second end 264 of bushing 208. Stem scraper 212 may be disposed in a third stepped section 219 of counter bore section 210. Stem scraper 212 has an outer diameter that is smaller than the inside diameter if third stepped section 219 and may move within third stepped section 219. Stem scraper will have an inside diameter that is greater than valve stem 206 but will be capable of removing unwanted debris from valve stem 206. Stem shield-retainer 213 may be disposed in a fourth stepped section 220 of counter bore section 210. Stem shield-retainer 213 may be retained in the housing by a press fit, staking or other suitable means. Stem shield-retainer 213 will retain stem scraper 212 in housing 201 and will limit the depositing of debris on valve stem 206. It should be noted that in this embodiment, stem scraper 212 and stem shield-retainer 213 are shown as two separate components but it is possible to combine their functions into a single component by selecting a suitable clearance between the outside diameter of valve stem 206 and the corresponding inside diameter of stem shield-retainer 213.

Valve stem 206 has a second end 259 extending axially through second stem seal 216 into actuator portion 226. A link 228 is disposed in housing 201 and attached to the second end 259 of valve stem 206 by threaded insert, riveting, staking, or other suitable means. Link 228 may be made of material such as injection molded plastic, die cast metal, or other suitable materials. A bearing 229 is attached to link 228 by a pin 230 and is secured by a press fit, riveting, staking or other suitable means.

Bias springs 231, 232 are disposed within housing 201. First ends 233, 234 of bias springs 231, 232 bear against stem link 228. Second ends 235, 236 of bias springs 231, 232 bear against housing 201. The compressed force 267 of bias springs 231, 232 will cause stem link 228, valve shaft 206, and poppet valve 205 to move in direction A and seat poppet valve 205 on valve seat 204 and essentially block fluid flow between inlet 202 and outlet 203. It may be noted that although two bias springs were used in this embodiment, it is possible to use one spring. The spring or springs may also be located in another location. For example, a spring may be installed coaxially on the valve shaft 206 and bear against housing 201 and link 228. The location of the spring may be determined by the desired bias force, size of the spring, available space in the housing, or other factors.

Figure 11:
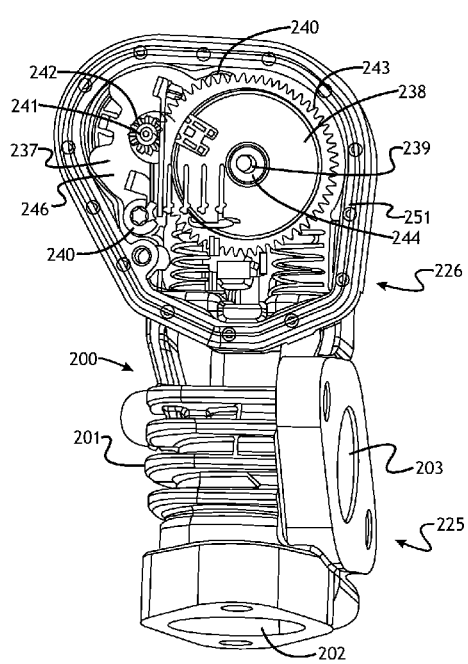
FIG. 11 is a perspective view, with portions removed, of an actuator and valve assembly according to a number of variations.
Figure 12:
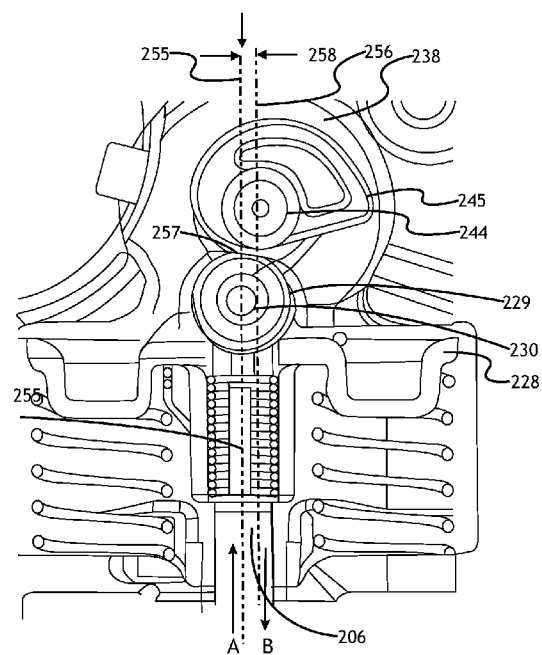
FIG. 12 is a partial, sectional view of an actuator and valve assembly according to a number of variations.

Referring to FIGS. 8B, 11, and 12, housing 201 has an actuator portion 226 for receiving the actuator components: D.C. motor 237, cam-gear 238, and pin 239. D.C. motor 237 is installed into actuator portion 226 and is retained by threaded fasteners 240 or other suitable means. D.C. motor 237 has a shaft 241 that is rotatable when an electrical control signal is applied to the D.C. motor 237. A pinion gear 242 is attached to shaft 241 and will rotate with the shaft. Cam-gear 238 has a gear section 243 that engages and rotates with pinion gear 242. Cam-gear 238 also has a central through-hole 244 that is sized to slide over pin 239. Pin 239 is press fit into housing 201 and will allow rotation of cam-gear 238 about its axis. Referring to FIG. 12, cam-gear 238 has a cam portion 245 integrally formed about the central through-hole 244. Cam portion 245 will rotate with cam gear 238.

Referring to FIGS. 8B and 12, bearing 229, attached to stem link 228, is positioned in relation to cam portion 245. The force of bias springs 231, 232 will cause stem link 228 and bearing 229 to move in direction A towards cam portion 245 and, under some conditions, will cause bearing 229 to bear against cam portion 245. When an electrical control signal is applied to D.C. motor 237, it may rotate the D.C. motor in a first direction causing shaft 241, pinion gear 242, cam-gear 238, and cam portion 245 to rotate and bear against bearing 229. The torque and force developed by D.C. motor 237, pinion gear 242, cam-gear 238, and cam portion 245 may be sufficient to overcome the compressed force 267 of bias springs 231, 232, and cause bearing 229, stem link 228, valve stem 206, and poppet valve 205 to move in direction B and unseat poppet valve 205 from valve seat 204 and allow fluid flow between inlet 202 and outlet 203. The bias springs 231, 232 will compress in height as poppet valve 205 is displaced away from valve seat 204. The compressed force 267 will increase as the compressed height of bias springs 231, 232 decreases.

The axial displacement of poppet valve 205 from valve seat 204 will in part be determined by the intensity level of the control signal applied to the D.C. motor 237. A higher intensity level will generally increase the force that will overcome the compressed force 267 of bias springs 231, 232 and increase the axial displacement between the poppet valve 205 and valve seat 204. A lower intensity level will generally decrease the force opposing compressed force 267 of bias springs 231, 232. The energy stored in bias springs 231,232, will cause bearing 229 to bear against cam portion 245 and force cam portion 245, cam gear 238, pinion gear 242 and shaft 241 to a position that will reduce the axial displacement between the poppet valve 205 and valve seat 204. If the valve is open, and the electrical control signal to the D.C. motor 237 is interrupted, the compressed force 267 of bias springs 231, 232, will generally cause bearing 229 to bear against cam portion 245 and force cam portion 245, cam-gear 238, pinion gear 242 and shaft 241 to a position that will seat poppet valve 205 on valve seat 204 and essentially block fluid flow between inlet 202 and outlet 203.

Figure 13:
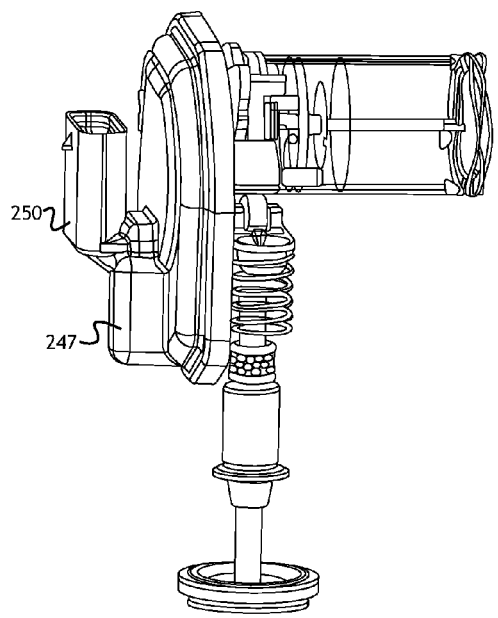
FIG. 13 is a perspective view, with portions removed, of an actuator and valve assembly according to a number of variations.
Figure 14:
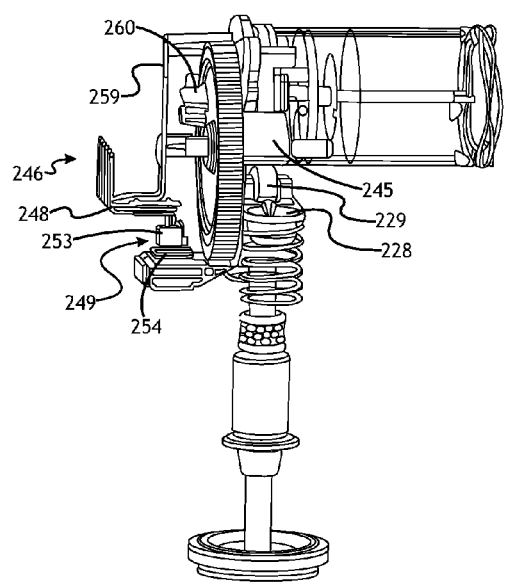
FIG. 14 is a perspective view, with portions removed, of an actuator and valve assembly according to a number of variations.

Referring to FIGS. 7, 11, 12, 13 and 14, valve assembly 200 has a lead frame 246 imbedded in cover 247. The cover 247 may be attached to housing 201 by crimp ring 268, threaded fasteners, or other suitable means. A seal 251 may be located between the cover and housing to prevent debris from entering the housing. FIG. 14 shows the lead frame 246 with cover material removed and FIG. 13 shows cover material over molded on the lead frame 246. The lead frame 246 may include several individual terminals, for example terminals 259 and 248 may provide electrical connection to D.C. motor 237 and a position sensor 249. A molded electrical connector 250 is formed in cover 247. A mating connector, with terminals, may engage electrical connector 250 and the terminals of lead frame 246 and make the electrical connections to an electrical control unit (ECU) 252.

The valve position and fluid flow is typically controlled by a closed loop control system that is part of an ECU 252 shown in FIG. 7. The ECU 252 will provide a control signal to the D.C. motor 237 and receive a poppet valve position feedback signal from position sensor 249. Position feedback signal is typically a position sensor output voltage. Each valve position will correspond to a specific position sensor output voltage. The ECU 252 will adjust the control signal to the D.C. motor to achieve and maintain a specific valve position that corresponds to the specific valve position sensor output voltage. For some conditions is may be desirable not to have bearing 229 bear against cam portion 245. For example, to ensure poppet valve 205 is completely seated on valve seat 204, it may be desirable to apply an electrical control signal to the D.C. motor that will cause D.C. motor 237, cam-gear 238, and cam portion 245 to rotate to a position that prevents cam portion 245 from contacting bearing 229. This will ensure poppet valve 205 is completely seated on valve seat 204. During this condition, there will be no force applied to the cam-gear 238 or cam portion 245 and it may move or cause unwanted noise during conditions such as high vibration. It may be desirable to apply an electrical control signal to the D.C. motor 237 that will cause the cam-gear 238 to rotate to a position where a physical stop 260, formed in cam-gear 238, engages a physical stop 260 in the cover 247, housing 201, or other suitable valve assembly component. The intensity level of the electrical control signal can be adjusted based upon factors such as the level of vibration or other factors. This electrical control signal may be referred to as a "holding" signal.

The position sensor 249 may be a non-contacting type and may use magneto-resistive, inductive or Hall Effect technology. Sensor 249 may have a sensing circuit 253 that will receive feedback from a sensing element 254.

Figure 15:
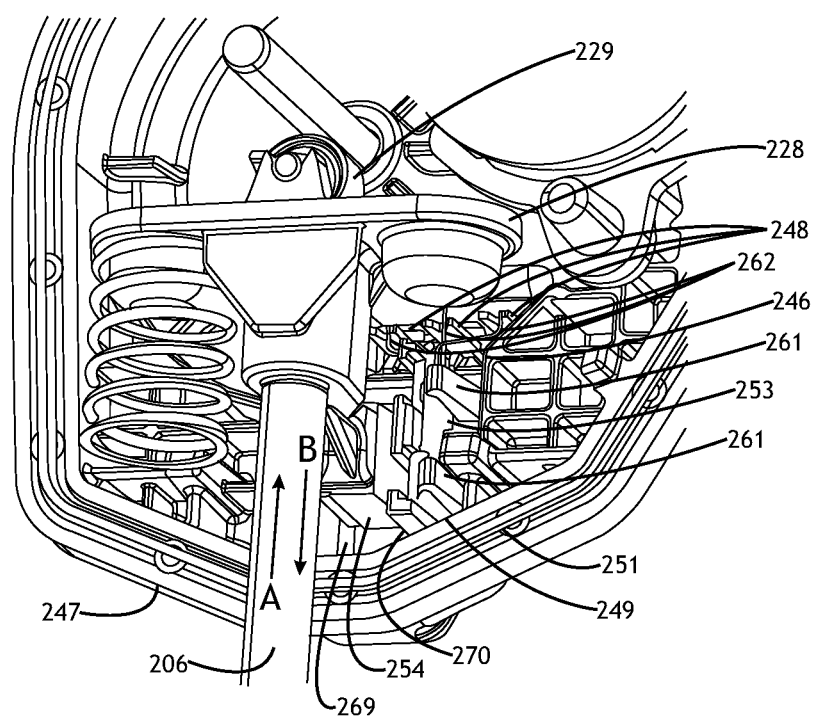
FIG. 15 is a partial, sectional view of an actuator and valve assembly according to a number of variations.

FIG. 15 shows an enlarged section of cover 247 with position sensor 249. Sensing circuit 253 may be attached to the cover 247 by snap retention features 261, heat staking, metal clips, overmolding or other suitable means. Sensor circuit leads 262 may be connected to the terminals 248 of lead frame 246 by welding, soldering, contact pressure, or other suitable means. It should be noted position circuit 253 is an integrated circuit that does not require a printed circuit boards, resistor, capacitors or other components.

The sensing element 254 may be attached to the stem link 228, valve stem 206, or other suitable location. For example, the sensing element 254 in valve assembly 200 is a permanent magnet that is over molded into link 228. Sensing element 254 must be spaced within a specific location of sensing circuit 253. Cover 247 has first a first surface 269, that will locate and limit sensing element 254 in a first direction, and a second surface 270 that will locate and limit sensing element 254 in a second direction. Sensing element 254 will provide a sensing parameter that will be measured by sensing circuit 253. The sensing circuit will measure the variable parameter, such as a variable magnetic field or magnetic field direction, when valve stem 206 is moved, in directions A and B, in response to an electrical control signal applied to D.C. motor 237. The sensing circuit will provided a valve position voltage that corresponds to a specific valve position.

It may be noted this sensing arrangement will provide actual valve position since the sensor element 254 is attached to link 228 and it is moving with valve stem 206 and poppet valve 205. This would be considered an advantage over the position sensing arrangement used for valve assembly 100 where the position sensor measures the position of the output shaft and an implied valve position is determined.

Another feature is the physical relationship of the cam portion 245, bearing 229, and valve stem 206. Referring to FIG. 12, the center of bearing 229 is aligned with the longitudinal central axis 255 of valve stem 206. The central axis 256 of cam portion 245 has been offset 258 from the longitudinal central axis 255 by an amount that will cause the force, transmitted by the cam portion 245 to bearing 229, to be applied essentially along the longitudinal central axis 255 of valve stem 206. The point of contact between the cam portion 245 and bearing 229 is shown as point 257 in FIG. 12. This point is essentially on the longitudinal central axis 255 of valve stem 206. Applying the force directly along the longitudinal central axis 255 of valve stem 206 will minimize radial forces on the valve stem that may cause friction and reduce the axial force applied to valve stem 206. The offset may be 0.5 mm to 2.0 mm or another value dependent in part by the size and shape of the cam portion 245.

Another difference between D.C. motor actuated poppet valve assemblies 100 and 200 is the manner in which the actuator moves the poppet valve between the open and closed valve positions. The actuator of D.C. motor actuated poppet valve assembly 100 has the ability to force movement of the valve in both directions, towards and away from the valve seat. The actuator of D.C. motor actuated poppet valve assembly 200 only has the ability to force the movement of the valve, in one direction, away from the valve seat, and relies on bias springs 231 and 232 to return the poppet valve to the valve seat.

Movement in one direction may be advantageous for reasons that may include: minimizing components, lower cost, smaller package space, lighter weight or other advantages. There may also be disadvantages that may include; the inability to overcome system restrictions resulting in an incorrect valve position, slow response, or other forms of degraded performance. The system restrictions may include: exhaust gas residue, friction, high viscosity bearing grease at lower temperatures, degraded spring force, valve obstruction, or other forms of restriction. For reference a condition with system restriction will be referred to as a "restricted valve movement". A condition without system restriction will be referred to as "unrestricted valve movement".

Referring to FIGS. 2 through 6, as previously described, D.C. motor actuated poppet valve assembly 100 has a cam 143 integrally formed in the gear 139. Ball bearing 127, attached to link 126, is engaged with cam 143. The cam 143 has contact surfaces 144 and 145 that may contact bearing 127. There is sufficient clearance between contact surfaces 144 and 145 and outside diameter of the bearing to allow relative movement. Contacting surfaces 144 and 145 of cam 143 are eccentric with the axis of the output gear 139 therefore rotation of the output gear 139 will cause bearing 127 to move radially with respect to the center axis of the output shaft 140. Since bearing 127, link 126, valve stem 106, and poppet valve 105 are interconnected; rotation of the output gear 139 in a first direction may cause ball bearing 127 to bear against cam surface 144 and cause the poppet valve to move in a first direction away from the valve seat; and, rotation of the output gear 139 in a second direction may cause bearing 127 to bear against surface 145 and cause the poppet valve to move in a second direction towards the valve seat. The actuator of D.C. motor actuated poppet valve assembly 100 has the ability to force movement of the poppet valve in both directions towards and away from the valve seat. The bi-directional forcing capability is achieved by moving a single component, bearing 127, on cam surfaces 144 and 145 of cam 143. The outside diameter of bearing 127 will, in part, determine the size of gear 139 and the size of the housing 101. In some instances this space and size may be considered excessive and alternate solutions may be needed to minimize the size.

Referring to FIGS. 7 through 15, as previously described, D.C. motor actuated poppet valve assembly 200 has a cam gear 238 and cam portion 245. Bearing 229, valve stem 206 and poppet valve 205 are attached to a stem link 228. Bearing 229 is held in contact with cam portion 245 by bias springs 231 and 232. Rotating cam gear 238 in a first direction may cause cam portion 245 bear against bearing 229 and move poppet valve 205 in a first direction away from the valve seat. Cam portion 245 must rely on bias spring 231 and 232 to maintain contact with bearing 229. When cam gear 238 is rotated in a second direction, bias springs 231 and 232 will force bearing 239 to bear against cam portion 245 and move poppet valve 205 in a second direction towards the valve seat 204. Since bearing 229 is only contacting cam portion 245, the size of cam gear 238 may be smaller than gear 139, of D.C. motor actuated poppet valve assembly 100, and housing 206, of D.C. motor actuated poppet valve assembly 200, may be smaller as a result of the smaller gear.

The actuator of D.C. motor actuated poppet valve assembly 200 only has the ability to force movement of the valve in only one direction, relative to the valve seat, and must rely on bias springs 231 and 232 to move the valve in a second direction relative to the valve seat. This may become an issue if there is a restricted valve movement condition within the actuator and valve assembly. The invention described in the following paragraphs will combine the advantages of D.C. motor actuated poppet valve assembly 200 and an assisted valve closing feature that will provide the ability of the actuator to force movement of the poppet valve in both directions relative to the valve seat.

Figure 16:
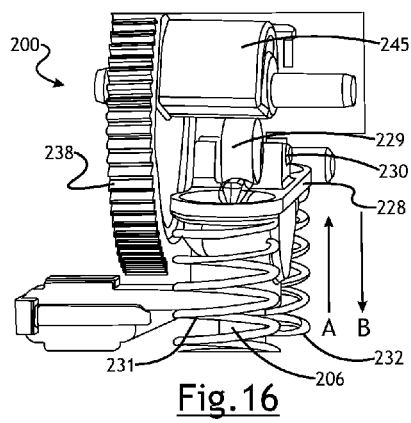
FIG. 16 is a partial perspective view, with portions removed, of an actuator and valve assembly according to a number of variations.
Figure 17:
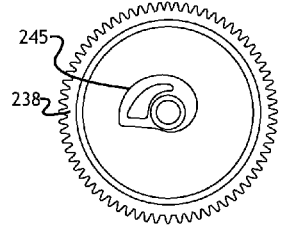
FIG. 17 illustrates a cam gear according to a number of variations.

FIG. 16 and FIG. 17 show the present arrangement for D.C. motor actuated poppet valve assembly 200 and cam gear 238. Bias springs 231 and 232 force bearing 229 to bear against cam portion 245 of cam gear 238. This arrangement will only be cable of having the actuator forcing movement of bearing 229, stem link 228, and valve stem 206 in a single direction B. Bias springs 231 and 232 will provide a bias force that will move bearing 229, stem link 228, and valve stem 206 in the opposite direction A as previously described.

Figure 18:
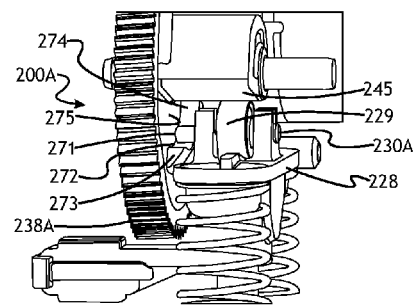
FIG. 18 is a partial perspective view, with portions removed, of an actuator and valve assembly according to a number of variations.
Figure 19:
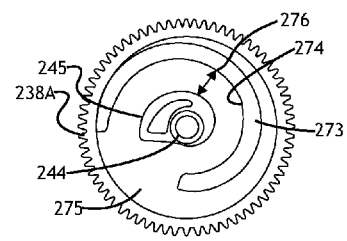
FIG. 19 illustrates a cam gear according to a number of variations.

Referring to FIGS. 18 and 19, a new arrangement is shown for a D.C. motor actuated poppet valve assembly 200A and cam gear 238A that will force movement of the poppet valve in both directions relative to the valve seat. The components of D.C. motor actuated poppet valve assembly 200A are similar to assembly 200 and similar numbers will be used to identify components.

FIG. 19 shows cam gear 238A that is similar to cam gear 238 of D.C. motor actuated poppet valve assembly 200. A valve return feature, 273 has been formed in cam gear 238A and extends axially from surface 275 of the cam gear. Valve return feature 273 has a surface 274 that also extends axially from surface 275 and is formed about the central through-hole 244 of cam gear 238A. Surface 274 is spaced apart from cam portion 245 by an offset 276. Surface 274 will generally be radially offset by a constant value that will follow the eccentric profile of cam feature 245 relative to central through-hole 244 of cam-gear 238A but offset 276 may also be varied to obtain the desire movement of the valve. Valve return feature 273 and cam portion 245 will rotate with cam gear 238A.

FIG. 18 shows D.C. motor actuated poppet valve assembly 200A. Bearing 229 is attached to stem link 228 by a pin 230A. Pin 230A has an extended portion 271 that extends towards surface 275 of cam gear 238A. Extended portion 271 is located between cam portion 245 and surface 274 of valve return feature 273. Extended portion 271, of pin 230A, will axially overlap cam portion 245 and surface 274 but may not contact cam portion 245. Extended portion 271 may also be radially spaced apart from surface 274 by a space 272 when bearing 229 is in contact with cam portion 245.

As mentioned, surface 274 may be eccentric to central through-hole 244 such that when extended portion 271 is held in a fixed position; rotation of the cam-gear 238A in a first direction will cause surface 274 to move away from extended portion 271 and increase space 272. Rotation of cam-gear 238A in a second direction that will reduced space 272 and may cause surface 274 to approach and contact extended portion 271. Contact between extended portion 271 and surface 274 may force movement of bearing 229, stem link 228, valve stem 206 and poppet valve 205 in a direction causing poppet valve 205 to move towards valve seat 204. Space 272 may be 0.25 mm, 0.75 mm or other dimension that will provide the desire valve return requirement for a specific application. Space 272 will determine the rotation of cam-gear 238A needed to establish contact between surface 274 and extended portion 271 of pin 230A.

Referring to FIGS. 20, 21, 22, 23 and 24 the valve return feature will operate in the following manner. FIG. 20 shows D.C. motor actuated poppet valve assembly 200A in an unpowered state. Bias springs 231 and 232 will force bearing 229 to bear against cam portion 245 forcing movement of bearing 229, stem link 228, valve stem 206 and poppet valve 205 in a direction causing poppet valve 205 to be seated on valve seat 204. Extended portion 271 is shown spaced apart from surface 274 by space 272. The axial displacement 278 between the poppet valve 205 and valve seat 204 will be minimal when poppet valve 205 is seated on valve seat 204.

FIG. 21 shows D.C. motor actuator poppet valve assembly 200A with the poppet valve 205 in the full open position. Cam gear 238A has been rotated in a direction that will cause cam portion 245 to bear against bearing 229 forcing movement of bearing 229, stem link 228, valve stem 206 and poppet valve 205 in a direction causing poppet valve 205 to be unseated from valve seat 204. Extended portion 271 is shown radially spaced apart from surface 274 by space 272. The displacement 278A, between the poppet valve 205 and valve seat 204, will be maximum when poppet valve 205 is in the full open position.

Figure 23:
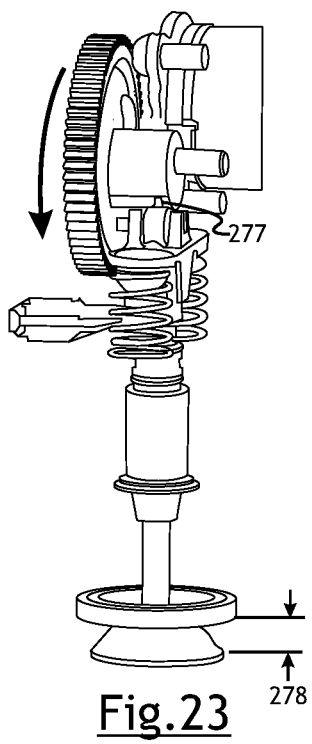
FIG. 23 shows a D.C. motor actuated poppet valve assembly in one of several progressive stages of closing the valve.
Figure 24:
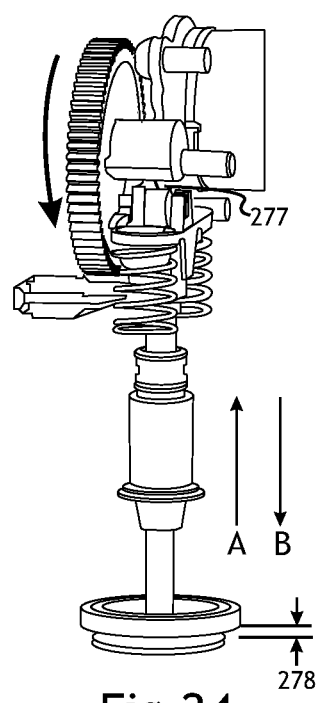
FIG. 24 shows a D.C. motor actuated poppet valve assembly in one of several progressive stages of closing the valve.

FIGS. 22, 23, and 24 show D.C. motor actuated poppet valve assembly 200A in progressive stages of closing the valve. The components and features of these figures are common and only relevant features and components will be identified. To describe the assisted closing feature, it will be assumed there is "restricted valve movement" preventing the force of bias springs 231 and 232 from seating poppet valve 205 on valve seat 204.

Referring to FIG. 22, cam-gear 238A is rotated in a direction that causes bias springs 231 and 232 to urge cam portion 245, bearing 229, stem link 228, valve stem 206, and valve 205 in a direction that will urge poppet valve 205 towards the valve seat 204. Since there is restricted valve movement, bias springs 231 and 232 do not have sufficient force to cause movement and displacement 278A may not change. Continued rotation of cam gear 238A will cause cam portion 245 to lose contact with bearing 229, and move away from bearing 229, creating space 277. Space 277 may increase as the cam gear continues to rotate in this direction. Space 272 between, the extended portion 271 and surface 274, will decrease because of the eccentric contour of surface 274. Continued rotation of cam gear 238A in this direction will cause further reduction of space 272 and extended portion 271 may contact surface 274 as shown in FIG. 23. Further rotation in this direction will cause surface 274 to bear on extended portion 271 and force pin 230A, bearing 229, stem link 228, valve stem 206, and poppet valve 205 to move in a direction "A" and force poppet valve 205 to move towards the valve seat 204. The forcing action of surface 274 onto extended portion 271 will continue as the cam-gear 238A rotates to a final position in this direction. The final displacement 278B, between the poppet valve 205 and valve seat 204, will become smaller as shown in FIG. 24.

The final displacement 278B will be determined, in part, by the initial space 272 in a valve with unrestricted valve movement. For Example, if the initial space 272 is 0.25 mm, the final displacement 278B, between the poppet valve 205 and valve seat 204, will be approximately 0.25 mm. Another value greater-or-less-than 0.25 mm may be used to achieve the finial displacement 278B value. For example, it may also be possible to select a final space 272 that will fully seat poppet valve 205 on valve seat 204. The values of space 272 will be 0.0 mm at the fully seated condition. This space may be achieved by contouring surface 274 of return feature 273. When space 272 is at 0.0 mm and poppet valve 205 is seated on valve seat 204, further attempts to rotate cam gear 238A will be resisted by the interference between the extended portion 271 and surface 274 of return feature 273. This condition may provide a physical "stop" or limitation for movement of cam gear 238A.

The advantage of using different component and different features for forcing bi-direction poppet valve movement, may be seen by comparing D.C. motor actuator poppet valve assembly 200A and D.C. motor actuator poppet valve assembly 100.

D.C. motor actuator poppet valve assembly 100 uses a bearing 127 and a cam feature 143, with 2 surfaces 144 and 145, to move the poppet valve in both directions relative to the valve seat. The outside diameter of the bearing must fit within cam 143 and it will determine the width of the cam slot and the outer dimension of the gear. The outer dimensions of the gear will, in part, determine the dimensions of the housing.

Referring to FIGS. 18 and 19, D.C. motor actuator poppet valve assembly 200A uses a cam portion 245 and ball bearing 229 to move the poppet valve 205 in a direction away from valve seat 204 but uses a second component, extended portion 271, and a second feature, return feature 273, to move the poppet valve 205 in a direction towards valve seat 204. Since the extended portion 271 is approximately located at the center of bearing 229 the distance 276, between cam portion 245 and return feature 273, will be less than that required for cam feature 143 of D.C. motor actuator poppet valve assembly 100. Minimizing distance 276 will reduce the space requirement for the gear 238A. The smaller space requirement for gear 238A will reduce the space requirement for the housing 201 of D.C. motor actuator poppet valve assembly 200A.

Figure 25:
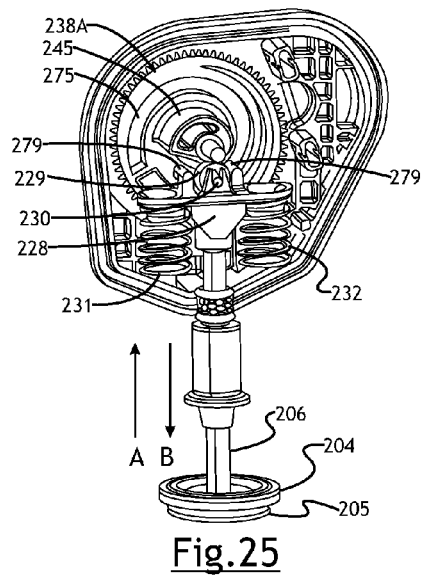
FIG. 25 is a perspective view, with portions removed, of an actuator and valve assembly according to another variation.
Figure 26:
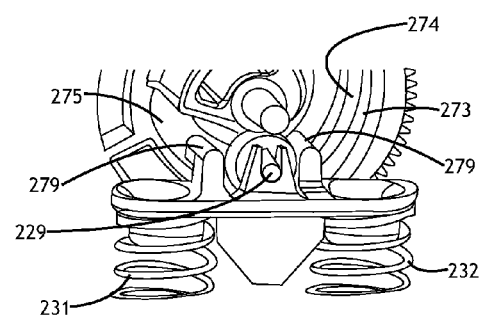
FIG. 26 is a partial, sectional view of an actuator and valve assembly according to another variation.

Other components and features may be used to move poppet valve 205 in the direction towards valve seat 204. A second embodiment is shown in FIGS. 25 and 26. The component, link 228A, has extended portions 279 that extend towards surface 275 of cam gear 238A. Extended portions 279 are located between cam portion 245 and surface 274 of valve return feature 273. Extended portions 279 will function in a similar manor to extended portion 271, as previously describe, and will force movement of poppet valve 205 towards valve seat 204 when a "restricted valve movement" condition exists.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

The above description of select variations within the scope of the invention is merely illustrative in nature and, thus, variations or variants thereof are not to be regarded as a departure from the spirit and scope of the invention.

What is claimed is:

1. An actuator and valve arrangement comprising:
   an actuator and valve portion
   at least one housing including the valve portion having a first port for receiving a fluid and a second port for delivering a fluid a valve seat disposed between the first and second port, a valve member operable with the valve seat for controlling fluid flow between the inlet and outlet ports;
   a valve stem operably connected to the valve member, having a longitudinal axis, a first end, second end and second portion, the valve member is attached at the first end and the second location is located between the valve member and the second end;
   a first component, operably connected to the second portion of the valve stem, for transmitting an operating force to the valve stem to force movement of the valve stem in a first direction;
   a second component, operably connected to the second location of the valve stem, for transmitting an operating force to the valve stem to force movement of the valve stem in a second direction;
   an actuator portion within the housing including a rotary actuator and at least one gear that is rotatable with the actuator; the at least one gear having first and second features for transmitting force from the actuator;
   a bias spring system including at least one spring providing a force applied to at least one of the first or second components and at least one of the first or second gear features that will urge movement the valve stem and valve member in relation to the valve seat;
   wherein during an unrestricted valve movement condition, where valve movement is not restricted, the first feature of the gear contacts the first component, operably connected to the second portion of the valve stem, for forcing the valve member in a first direction, either towards or away from the valve seat, when the gear is rotated in a first direction by the actuator and;
   during a restricted valve movement condition, where valve movement is restricted, the second feature of the gear contacts the second component, operably connected to the second portion on the valve stem, for forcing the valve member in a second direction, either towards or away from the valve seat, when the gear is rotated in a second direction by the actuator.

2. The actuator and valve arrangement of claim 1 wherein:
   during the unrestricted valve movement condition where valve movement is not restricted, the first feature of the gear contacts the first component, operably connected to the second portion of the valve stem, for forcing the valve member in a first direction, either towards or away from the valve seat, when the gear is rotated in a first direction by the actuator and;
   the bias spring system providing the force to the first component and first feature of the gear that will move valve member in a second direction either towards or away from the valve seat when the gear is rotated by the actuator in a second direction or is unpowered; and wherein the second feature of the gear does not contact the second component operably connected to the second location on the valve stem.

3. The actuator and valve arrangement of claim 1 wherein, the first component is a bearing and the first feature of the gear is a cam portion.

4. The actuator and valve arrangement of claim 1 wherein, the second component is an extended portion of a pin and the second feature of the gear is a return assist feature formed in the gear.

5. The actuator and valve arrangement of claim 1 wherein, the second component is an extended portion of a link operably connected to the second location on the valve stem.

6. The actuator and valve arrangement of claim 1 wherein, when the valve member is fully seated on the valve seat and the second component is in contact with the second feature of the gear, further movement of the gear is resisted.

7. A product comprising an actuator and valve assembly, the actuator including a cam gear having a return feature surface that extends axially from a cam gear surface and is formed about a central through-hole of cam gear, the cam gear having a cam portion, and the return feature surface being spaced apart from a cam portion of the cam gear by an offset.

8. A product as set forth in claim 7 wherein the return feature surface is radially offset by a constant value that will follow the eccentric profile of cam portion relative to the central through-hole of cam-gear.

9. A product as set forth in claim 7 wherein the return feature surface is radially offset by a varied amount to obtain a desire movement of the valve.

* * * * *